United States Patent
Luginsland

[15] 3,660,129

[45] May 2, 1972

[54] PROCESS FOR THE MANUFACTURE OF A FREE-FLOWING TITANIUM DIOXIDE PIGMENT

[72] Inventor: Hans Hermann Luginsland, Opladen, Germany

[73] Assignee: Titangesellschaft mbH, Leverkusen, Germany

[22] Filed: May 15, 1970

[21] Appl. No.: 37,859

[30] Foreign Application Priority Data

May 27, 1969 Germany..................P 19 26 905.7

[52] U.S. Cl..............................106/300, 106/308 B, 106/309
[51] Int. Cl..........................................................C09c 1/36
[58] Field of Search................................106/300, 308 B, 309

[56] References Cited

UNITED STATES PATENTS 3,513,007  5/1970  Lederer..................................106/300
3,520,710  7/1970  Kniffin....................................106/300

Primary Examiner—James E. Poer
Attorney—Charles F. Kaegebehn, Robert L. Lehman and Harold L. Gammons

[57] ABSTRACT

A free-flowing titanium dioxide pigment is prepared by employing the following process steps:

1. coating the titanium dioxide pigment with hydrous oxides;

2. sand milling the coated pigment; and 3. drying the sand milled pigment in a spray drier.

4 Claims, No Drawings

PROCESS FOR THE MANUFACTURE OF A FREE-FLOWING TITANIUM DIOXIDE PIGMENT

BACKGROUND OF THE INVENTION

Titanium dioxide pigments are frequently subjected to a post-treatment with inorganic substances in order to improve some properties, e.g., the weathering resistance. As used herein the term "post-treatment" has reference both to post-calcination treatment of sulfate-base pigments and treatment of raw, chloride-base pigments. The post-treatment is carried out in general in such a way that by mixing the pigment in an aqueous slurry with one or more water-soluble substances and precipitating at least one colorless difficultly soluble compound therefrom onto the pigment whereupon the pigment is separated, washed, dried and finally subjected to fine milling in the dry state in order to comminute pigment agglomerates difficult to disintegrate.

Pigments post-treated in such a manner usually are not free-flowing. The fine powder cakes easily and adheres to the walls of the containers or devices. In addition, the pigments develop a great amount of dust which is particularly annoying when handling the pigments. Consequently difficulties arise with such pigments in transporting, in storing and in dosing i.e. adding in measured amounts to other material(s).

The manufacture of a free-flowing titanium dioxide pigment which no longer shows the above-stated disadvantages is known to the art from GB-PS809,284. According to this process a titanium dioxide pigment is slurried in a liquid capable of evaporation, preferably water, and the slurry is dried in a spray drier.

The treatment of a finished post-treated titanium dioxide pigment in this manner is very expensive owing to the additional processing steps. Moreover if the spray drying is included as a step in the above-described post-treatment itself i.e., by drying the pigment after separation and washing in a spray drier before it is finally milled, then a free-flowing product is not obtained since the improvement of flowability produced by the spray drying is nullified by the final milling. Further, if the subsequent milling of the post-treated product obtained from the spray drier is omitted, there is obtained a product which, indeed, shows good flow-ability but which shows considerable inferiority in optical properties e.g., in tinting strength and in the color-tone when tested in gray-color systems.

SUMMARY OF THE INVENTION

A new process for the manufacture of a free-flowing post-treated titanium dioxide pigment has now been found. The process is characterized in that a titanium dioxide pigment manufactured in any manner whatsoever is first treated in aqueous slurry with inorganic substances with precipitation of at least one colorless, difficultly soluble compound and thereafter, without drying, is subjected to wet milling in a sand mill and finally dried in a spray drier.

DESCRIPTION OF PREFERRED EMBODIMENT.

The wet milling may take place at various places within the post-treatment process after the precipitation of the difficulty-soluble compound or compounds. According to one form of carrying out the process according to the invention, the titanium dioxide pigment is first filtered and washed after the precipitation of the difficulty soluble compound or compounds and subsequently the moist pulp is subjected to wet sand milling. However, the process may also be carried out in such a way that the titanium dioxide pigment slurry is, after the precipitation of the difficulty soluble compound or compounds, first subjected to wet sand milling, and that subsequently the titanium dioxide pigment is filtered and washed. A suitable form of carrying out the process consists, furthermore, in drying the titanium dioxide pigment in the spray drier in the presence of an organic substance.

According to the process of the invention the titanium dioxide is subjected to a combination of the following three processing steps; first, to a treatment with inorganic substances, secondly, to wet milling in a sand mill, thirdly, to a spray drying wherein the processing steps are always followed according to the sequence stated. Thus, it is now possible to manufacture, in a simple manner, titanium dioxide pigments having firstly, good flowability and practically no development of dust, secondly, improved properties e.g. weathering resistance, owing to the post-treatment with inorganic substances and, thirdly, good optical properties, e.g., in respect to tinting strength and color tone in gray-colored systems.

A titanium dioxide pigment manufactured in any manner whatsoever may be subjected to the process according to the invention. This pigment may have been manufactured according to different processes as, for example, according to the so-called sulfate process or chloride process.

The treatment with inorganic substances is carried out in an aqueous slurry while precipitating at least one colorless, difficultly soluble compound. This is accomplished, for example, as follows:

The pigment is slurried in water with the addition of a dispersing agent and alkali if required and subjected to a wet milling and/or classification if desired. The aqueous slurry while stirring is mixed, in any desired sequence with a water-soluble silicate and/or a water soluble aluminum salt and/or one or more other water soluble metal salts which form colorless and difficultly-soluble hydrated oxides or other colorless and difficultly-soluble compounds in the subsequent neutralization. If the slurry has an acid reaction, hydroxyl ions, and, as the case may be, additional anions are added for the precipitation of at least one difficultly-soluble compound, and subsequently additional hydroxyl ions are added until the reaction is at least neutral. At alkaline reaction of the suspension, on the other hand, acid is added until the reaction is at least neutral.

Wet milling after treatment with inorganic substances must be sufficiently intensive in order to obtain the desired optical properties in the finished pigment. Such an intensive wet milling is secured by means of a sand mill. After the slurry has been subjected to wet milling, it is conveyed to a spray drier. The post-treated titanium dioxide pigment obtained from the spray drier is free-flowing, develops practically no dust and has good optical properties. Moreover it contains no pigment agglomerates difficult to comminute so that a final dry milling is not required. The product may be packed, stored, transported and added in measured amounts, or doses, to other material(s) without any difficulties.

For specific purposes, it is often of advantage to add, in a manner known as such, an organic substance prior to or during the spray drying.

Pigments were prepared by various methods in the following examples and the pigment properties were determined as follows:

1. Tinting Strength:

The determination was carried out according to "Official Digest," July 1962, pp. 704–715, particularly 712–713.

2. Color tone of gray-colored systems:

The determination was carried out according to a method described in the same publication, especially on p. 711.

3. Flowability:

For the testing of flowability about 50 g. of the dry titanium dioxide pigment were filled into a funnel having a definite outlet diameter and the flowing out evaluated according to the following flowing scale:

Flowing rate 1: Pigment flows freely through a funnel having an outlet diameter of 2.9 mm.

Flowing rate 2: Pigment flows freely through a funnel having an outlet diameter of 6.7 mm.

Flowing rate 3: Pigment flows freely through a funnel having an outlet diameter of 14.9 mm.

Flowing rate n: Pigment does not flow through a funnel of 14.9 mm. outlet diameter in spite of frequent knocking at the funnel neck.

The following examples will clarify the invention in greater detail:

EXAMPLE I

To an aqueous slurry of rutile pigment heated to 60°C. was added a titanyl sulfate solution in amount of 1 percent calculated as $TiO_2$ and an aluminum sulfate solution in an amount of 3 percent calculated as $Al_2O_3$ (both additions based on the amount of pigments employed), and subsequently ammonia solution was added up to a pH of 8.3. After stirring for 2 hours, the slurry which contained 335 gpl. pigment was milled in a sand mill fitted with a stirring device. 90 kg. Ottawa sand having a grain size of ca. 0.7 mm. were employed as milling bodies; the slurry was put three times through the mill at a pumping rate of 500 liters per hour. After milling, the pigment was filtered, washed with water free from salt and the paste obtained was subsequently put through a spray drier. The properties of the pigment were determined and are recorded in the following Table along with the other examples.

EXAMPLE II

Example I was repeated except that the pigment was not subjected to sand milling.

EXAMPLE III

Rutile pigment was treated with titanyl sulfate and aluminum sulfate, as in Example I. After neutralization the pigment was filtered, dried in a drying oven and subsequently milled in a steam jet mill.

EXAMPLE IV

A rutile pigment was mixed in aqueous solution at 60°C. while stirring constantly with a sodium silicate solution in an amount of 1.8 percent calculated as $SiO_2$ and an aluminum sulfate solution in an amount of 2.1 percent calculated as $Al_2O_3$, (both additions based on the amount of pigment employed) and subsequently ammonia solution was added up to a pH value of 8.3. The pigment was then filtered and washed with desalted water. The paste obtained was diluted with desalted water so that a slurry having a content of 500 gpl. pigment was obtained. This slurry was then milled in the sand mill described in Example I, wherein it was put twice through the sand mill at a pump output of 500 liters per hour. Subsequently the product was dried in a spray drier.

EXAMPLE V

Example IV was repeated except that prior to the spray drying, tetraethylene glycol was added to the pigment in an amount of 1 percent on the basis of pigment.

EXAMPLE VI

Example IV was repeated with the difference that the pigment was not subjected to sand milling.

EXAMPLE VII

Rutile pigment was treated, as in Example IV, with sodium silicate and aluminum sulfate, neutralized with ammonia, filtered and washed. The pigment was then dried and subsequently milled in a steam jet mill.

All of the pigments described above were tested and the results are all recorded in the following Table.

From the table the following observations may be made:
Examples III and VII show titanium dioxide pigments post-treated according to known processes and finally subjected to jet milling. They show, indeed, good optical properties but poor flowability. If the post-treated titanium dioxide pigment is finished by spray drying instead of jet milling and without a prior wet milling with a sand mill, the flowability is improved

TABLE

| Example No. | Post treatment substances | Sand milling | Spray drying | Jet milling | Tinting strength | Color tone | Flowability | Remarks |
|---|---|---|---|---|---|---|---|---|
| I | 1% $TiO_2$ plus 3% $Al_2O_3$ | Yes | Yes | | 1,830 | +4.0 | 2 | Sand milling took place prior to filtration and washing. |
| II | do | | Yes | | 1,650 | +2.1 | 1 | |
| III | do | | | Yes | 1,845 | +3.3 | n | |
| IV | 1.8% $SiO_2$ plus 2.1% $Al_2O_3$ | Yes | Yes | | 1,875 | +0.5 | 1 | Do. |
| V | do | Yes | Yes [1] | | 1,930 | +0.7 | 2 | Do. |
| VI | do | | Yes | | 1,595 | −0.9 | 2 | |
| VII | do | | | Yes | 1,810 | +0.1 | 3 | |

[1] Addition of tetra ethylene glycol prior to spray drying.

but the pigments show very poor optical properties (Examples II and VI).

If, on the other hand, a pigment is first post-treated with inorganic substances followed by sand milling and then spray drying (Examples I, IV and V), pigments are obtained which exhibit very good optical characteristics as well as good flowability.

While this invention has been described and illustrated by the examples shown, it is not intended to be strictly limited thereto, and other variations and modifications may be employed within the scope of the following claims.

1. Process for the manufacture of a free-flowing post-treated titanium dioxide pigment which comprises preparing an aqueous slurry of titanium dioxide pigment, adding inorganic water-soluble salts to said slurry and precipitating at least one colorless difficulty-soluble compound therefrom to form a treated titanium dioxide pigment, wet sand milling the treated pigment without prior drying and then drying the milled pigment in a spray drier.

2. Process according to claim 1, characterized in that the titanium dioxide pigment, after treatment with the colorless difficulty soluble compound is filtered and washed and the resulting wet pulp is subjected to wet sand milling.

3. Process according to claim 1, characterized in that the aqueous slurry containing said treated pigment is subjected to wet sand milling and thereafter the treated titanium dioxide pigment is filtered and washed.

4. Process according to claim 1, characterized in that the sand-milled titanium dioxide pigment is first mixed with tetraethylene glycol and then dried in a spray drier.

* * * * *